US009048490B2

(12) United States Patent
Ishibashi et al.

(10) Patent No.: US 9,048,490 B2
(45) Date of Patent: Jun. 2, 2015

(54) LITHIUM ION SECONDARY BATTERY

(75) Inventors: Tatsuya Ishibashi, Osaka (JP); Kazuki Endo, Osaka (JP); Yasunari Sugita, Osaka (JP); Masato Fujikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/131,400

(22) PCT Filed: Apr. 26, 2012

(86) PCT No.: PCT/JP2012/002888
§ 371 (c)(1),
(2), (4) Date: Jan. 7, 2014

(87) PCT Pub. No.: WO2013/014833
PCT Pub. Date: Jan. 31, 2013

(65) Prior Publication Data
US 2014/0147715 A1    May 29, 2014

(30) Foreign Application Priority Data

Jul. 25, 2011 (JP) ................................ 2011-161682

(51) Int. Cl.
| H01M 2/14 | (2006.01) |
| H01M 2/18 | (2006.01) |
| H01M 2/34 | (2006.01) |
| H01M 10/0587 | (2010.01) |
| H01M 10/0525 | (2010.01) |
| H01M 2/26 | (2006.01) |

(52) U.S. Cl.
CPC ............ *H01M 2/34* (2013.01); *H01M 10/0587* (2013.01); *Y02E 60/122* (2013.01); *Y02T 10/7011* (2013.01); *H01M 2/26* (2013.01); *H01M 10/0525* (2013.01)

(58) Field of Classification Search
CPC ...... H01M 2/34; H01M 2/26; H01M 10/0587
USPC .......................................... 429/133, 131, 164
See application file for complete search history.

(56) References Cited

U.S. PATENT DOCUMENTS

| 5,989,743 A | 11/1999 | Yamashita |
| 2002/0090545 A1 | 7/2002 | Okochi et al. |
| 2004/0265700 A1 | 12/2004 | Ugawa et al. |

FOREIGN PATENT DOCUMENTS

| JP | 06-150973 A | 5/1994 |
| JP | 8-153542 A | 6/1996 |
| JP | 9-180761 A | 7/1997 |
| JP | 2004-087481 A | 3/2004 |
| JP | 2005-085674 A | 3/2005 |

OTHER PUBLICATIONS

International Search Report issued in International Application No. PCT/JP2012/002888 mailed Jul. 24, 2012, with English translation, 6 pgs.

*Primary Examiner* — Helen O Conley
(74) *Attorney, Agent, or Firm* — McDermott Will & Emery LLP

(57) ABSTRACT

A lithium ion secondary battery includes an electrode group formed by winding a positive electrode having a positive electrode current collector and a positive electrode active material layer, and a negative electrode having a negative electrode current collector and a negative electrode active material layer, with a separator interposed between the electrodes. A wound positive electrode current collector exposing section faces a wound negative electrode current collector exposing section with the separator interposed therebetween, thereby forming a heteropolar electrode current collector facing zone corresponding to at least one turn in the electrode group. A unipolar electrode current collector facing zone, in which adjacent portions of the wound current collector exposing section or the wound current collector exposing section face each other directly or with the separator interposed therebetween corresponds to at least one turn in the electrode group.

3 Claims, 5 Drawing Sheets

LITHIUM ION SECONDARY BATTERY

TECHNICAL FIELD

The present disclosure relates to lithium ion secondary batteries, and more particularly, to a lithium ion secondary battery with an electrode group including a positive electrode and a negative electrode wounded together.

BACKGROUND ART

A lithium ion secondary battery includes a positive electrode, a negative electrode, a separator interposed between the positive electrode and the negative electrode, and a nonaqueous electrolyte. The positive electrode includes a positive electrode current collector made of, e.g., aluminum and a positive electrode active material layer formed on a surface of the positive electrode current collector and including a positive electrode active material such as a lithium composite oxide. The negative electrode includes a negative electrode current collector made of, e.g., copper and a negative electrode active material layer formed on a surface of the negative electrode current collector and including a negative electrode active material such as a carbonaceous substance. An electrode group is formed by winding the positive electrode and the negative electrode with the separator interposed therebetween. The electrode group and the nonaqueous electrolyte are housed together in a battery case, thereby forming a lithium ion secondary battery.

Generally, when an internal short circuit occurs through the positive electrode active material layer and the negative electrode active material layer in a lithium ion secondary battery, a large current flows to the point of the short circuit and heat is increasingly generated in the battery, resulting in a risk of excessive heating of the battery. In order to avoid this phenomenon, lithium ion secondary batteries are equipped with a shutdown mechanism in which micro-pores formed in the separator are closed by the heat generated by the short circuit.

However, when external force crushes a battery (crushing), or an electric conductor such as a nail having a large diameter penetrates a battery (nail penetration), a rupture takes place in the separator, and an inner short circuit occurs in a larger area, thereby easily causing excessive heating. In that case, since heat is abruptly generated near the point of short circuit, a meltdown in which a portion of the separator surrounding the point of short circuit melts and shrinks takes place to cause further short circuits, resulting in a risk of excessive heating of the battery.

In order to solve the above described problem, it is proposed to form, in a battery, a heteropolar metal part facing zone by providing an exposed metal part which is at the same potential as the positive electrode and another exposed metal part which is at the same potential as the negative electrode such that the exposed metal parts face each other (see, e.g., Patent Document 1). In particular, with respect to a wound-type battery, it is proposed to form a heteropolar electrode current collector facing zone where a positive electrode current collector exposing section faces a negative electrode current collector exposing section. The positive electrode current collector exposing section is free of an active material layer and located in an outer circumferential portion of the positive electrode included in the electrode group. The negative electrode current collector exposing section is free of an active material layer and located in an outer circumferential portion of the negative electrode included in the electrode group. In addition, it is proposed to form a heteropolar metal facing zone which is formed by a current collector exposing section and a battery case being in electrical connection to the electrode having a polarity opposite to that of the current collector exposing section. These proposed configurations allow crushing or nail penetration to cause an inner short circuit with low short-circuit resistance, and accordingly, excessive heating can be prevented. Even if the crushing or the nail penetration progresses after occurrence of the short circuit and a point of short circuit is produced between the active material layers, since a short circuit occurring between metals having low specific resistance has short-circuit resistance lower than short-circuit resistance between the active material layers, a reduced current is allowed to pass between the active material layers, and accordingly, excessive heating of the battery can be prevented (see, e.g., Patent Documents 1 and 2).

CITATION LIST

Patent Document

PATENT DOCUMENT 1: Japanese Unexamined Patent Publication No. H08-153542
PATENT DOCUMENT 2: Japanese Unexamined Patent Publication No. H09-180761

SUMMARY OF THE INVENTION

Technical Problem

However, as the capacity of a battery increases, a current caused to flow due to occurrence of an inner short circuit in the battery increases. Therefore, a current passing between active material layers may not be sufficiently reduced with the conventional configurations.

It is therefore an object of the present disclosure to provide a lithium ion secondary battery having a large capacity and being capable of easily improving safety against a short circuit caused by nail penetration or crushing.

Solution to the Problem

To achieve the object, a lithium ion secondary battery of the present disclosure includes a zone in which adjacent portions of a positive electrode current collector exposing section where a positive electrode current collector is exposed, or adjacent portions of a negative electrode current collector exposing section where a negative electrode current collector is exposed face each other, and the zone corresponds to one turn or more in an electrode group.

Specifically, a lithium ion secondary battery of the present disclosure includes: an electrode group formed by winding a positive electrode and a negative electrode with a separator interposed therebetween, where the positive electrode includes a positive electrode current collector and a positive electrode active material layer formed on a surface of the positive electrode current collector and the negative electrode includes a negative electrode current collector and a negative electrode active material layer formed on a surface of the negative electrode current collector; a nonaqueous electrolyte; and a battery case housing therein the electrode group and the nonaqueous electrolyte, wherein the positive electrode has a positive electrode current collector exposing section which is free of the positive electrode active material layer and in which the positive electrode current collector is exposed, the negative electrode has a negative electrode current collector exposing section which is free of the negative electrode active material layer and in which the negative electrode current collector is exposed, adjacent portions of the wound positive electrode current collector exposing section or adjacent portions of the wound negative electrode current collector exposing section face each other directly or with the separator interposed therebetween and thereby form a unipolar electrode current collector facing zone, and the unipolar electrode current collector facing zone corresponds to at least one turn in the wound electrode group.

In the lithium ion secondary battery of the present disclosure, since the unipolar electrode current collector facing zone corresponds to at least one turn in the wound electrode group, a substantial thickness of the unipolar electrode current collector facing zone is larger than a thickness of a single layer of the positive or negative electrode current collector. Accordingly, short-circuit resistance caused by an inner short circuit occurring between the positive and negative electrodes can be further reduced. The thickness of a portion where a short circuit occurs when the battery is crushed by external force (crushing) or penetrated by an electric conductor such as a nail having a large diameter (nail penetration) can be easily increased by forming the unipolar electrode current collector facing zone, without changing the thickness of the positive electrode current collector or the negative electrode current collector. Accordingly, the short-circuit resistance can be reduced. When the battery is designed such that the separator is interposed between the adjacent portions of the current collector forming the unipolar electrode current collector facing zone, since it is unnecessary to remove a portion of the separator from the unipolar electrode current collector facing zone, the safety of the battery can be improved without making a great change in a fabrication process of the battery. Further, providing the separator increases physical strength, and makes it possible to prevent, e.g. rupture of the current collector when winding the current collector exposing section.

It is preferable that, in the lithium ion secondary battery of the present disclosure, the wound positive electrode current collector exposing section and the wound negative electrode current collector exposing section face each other with the separator interposed therebetween and thereby form a heteropolar electrode current collector facing zone, and the heteropolar electrode current collector facing zone corresponds to at least one turn in the electrode group.

With this configuration, occurrence of crushing or nail penetration easily causes an inner short circuit between the positive electrode current collector exposing section and the negative electrode current collector exposing section.

It is preferable that, in the lithium ion secondary battery of the present disclosure, the battery case is in electrical connection to the positive electrode or the negative electrode, one of the wound positive electrode current collector exposing section or the wound negative electrode current collector exposing section which has a polarity opposite to that of the electrode being in electrical connection to the battery case forms the unipolar electrode current collector facing zone, the unipolar electrode current collector facing zone extends in an outermost circumferential portion of the electrode group, and an insulating layer is interposed between the battery case and the unipolar electrode current collector facing zone.

With this configuration, occurrence of crushing or nail penetration causes an inner short circuit between the battery case and the outermost circumferential portion of the electrode group.

It is preferable that, in the lithium ion secondary battery of the present disclosure, the unipolar electrode current collector facing zone, and one of the positive electrode current collector exposing section or the negative electrode current collector exposing section which has a polarity opposite to that of the unipolar electrode current collector facing zone and which is disposed inside the unipolar electrode current collector facing zone form the heteropolar electrode current collector facing zone.

With this configuration, since it is possible to cause an inner short circuit between the positive electrode current collector exposing section and the negative electrode current collector exposing section, heating of the battery can be reduced.

It is preferable that, in the lithium ion secondary battery of the present disclosure, the unipolar electrode current collector exposing section forming the unipolar electrode current collector facing zone corresponds to three to five turns inclusive, in the electrode group.

With this configuration, it is possible to sufficiently reduce short-circuit resistance caused by an inner short circuit occurring between the positive electrode current collector exposing section and the negative electrode current collector exposing section.

It is preferable that, in the lithium ion secondary battery of the present disclosure, the a ratio of a capacity of the lithium ion secondary battery to a total thickness of the positive electrode current collector exposing section or the negative electrode current collector exposing section which forms the unipolar electrode current collector facing zone is 40-100 mAh/μm inclusive.

With this configuration, it is possible to change short-circuit resistance caused by an inner short circuit in accordance with changes in the battery capacity.

Advantages of the Invention

According to the present disclosure, since short-circuit resistance caused by an inner short circuit occurring between the positive electrode and the negative electrode can be easily reduced, safety of the battery can be improved.

BRIEF DESCRIPTION OF THE DRAWINGS

FIG. 6 is a graph on which plots of battery surface temperatures after a lapse of 30 seconds from nail penetration are put, with respect to a ratio of battery capacity to a total thickness of the positive electrode current collector exposing section in the positive electrode current collector facing zone.

DESCRIPTION OF EMBODIMENTS

An embodiment of the present disclosure will be described below with reference to the drawings. Note that the scope of the present disclosure is not limited to the embodiment below.

Changes may be made as appropriate without departing from the scope of the present disclosure as far as the advantages of the disclosure are obtained.

Figure 1:
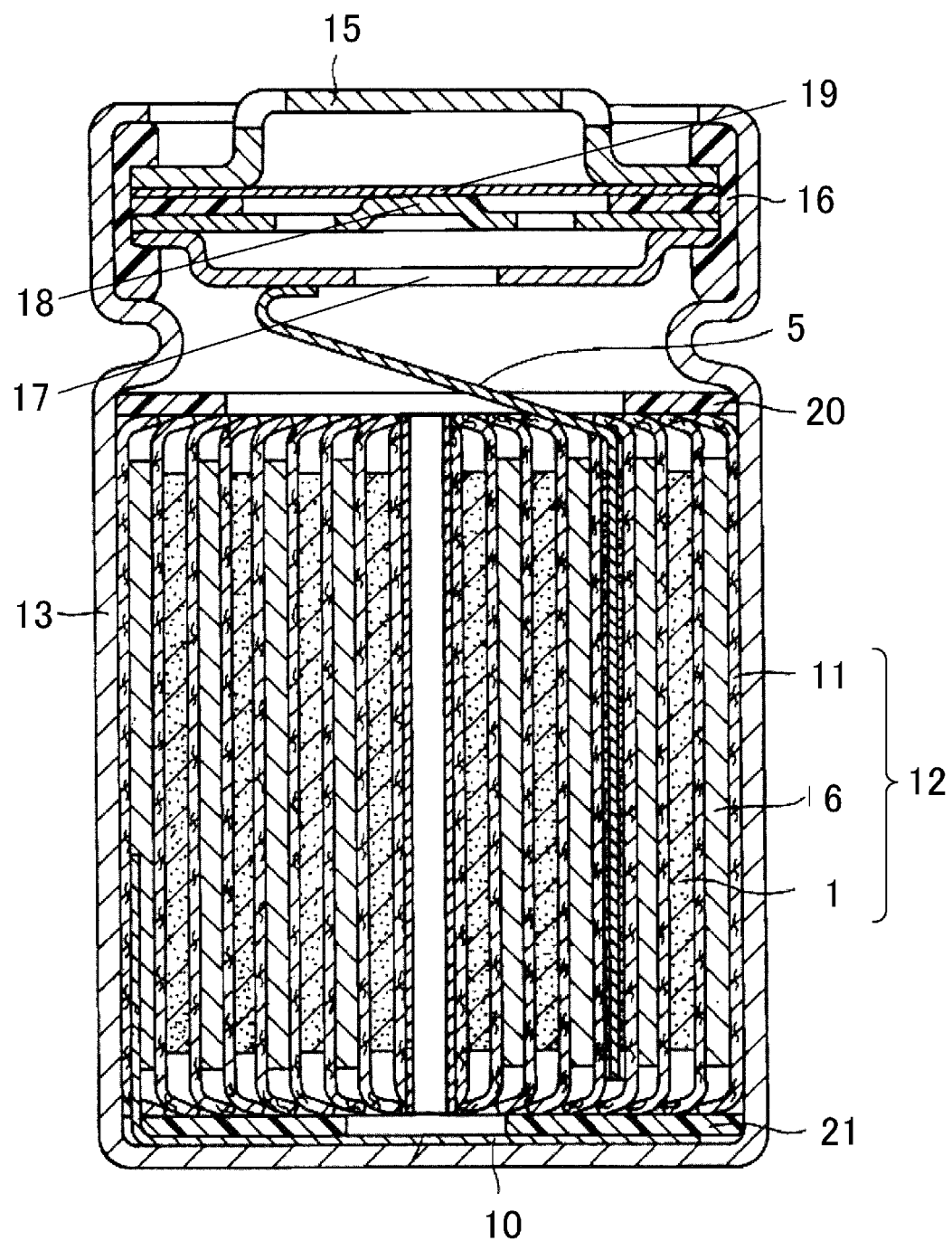
FIG. 1 is a cross-sectional view schematically illustrating a lithium ion secondary battery according to an embodiment of the present disclosure.

First, a lithium ion secondary battery according to the embodiment of the present disclosure is described below with reference to FIG. 1. FIG. 1 is a cross-sectional view schematically illustrating the lithium ion secondary battery according to the embodiment of the present disclosure.

As illustrated in FIG. 1, the lithium ion secondary battery of this embodiment includes an electrode group 12 formed by winding a positive electrode 1 and a negative electrode 6 with a separator 11 interposed therebetween. The electrode group 12 and a nonaqueous electrolyte are housed in a battery case 13. An upper insulating plate 20 and a lower insulating plate 21 are disposed at the top and the bottom of the electrode group 12, respectively. Above the upper insulating plate 20, a filter 17 is in connection to an inner cap 18, and a projection of the inner cap 18 is in connection to a metal valve 19. The valve 19 is in connection to a terminal plate 15 which also serves as a positive electrode terminal. The terminal plate 15, the valve 19, the inner cap 18, and the filter 17 seal, in an integral manner and through a gasket 16, an opening of the battery case 13.

The positive electrode 1 is in connection to the filter 17 through a positive electrode lead 5. The negative electrode 6 is in connection to the bottom of the battery case 13 through a negative electrode lead 10. The bottom of the battery case 13 also serves as a negative electrode terminal.

The positive electrode 1 includes a positive electrode current collector 3 and a positive electrode active material layer 2 supported on the current collector 3. A positive electrode mixture forming the positive electrode active material layer 2 may contain, e.g., a binder and a conductive agent in addition to a positive electrode active material. For example, the positive electrode 1 is produced in the following manner. The positive electrode active material and the positive electrode mixture containing optional constituents are mixed with a liquid constituent to prepare positive electrode material mixture slurry. The resultant slurry is applied to the positive electrode current collector 3, and then dried.

The negative electrode 6 includes a negative electrode current collector 8 and a negative electrode active material layer 7 supported on the current collector 8. A negative electrode mixture forming the negative electrode active material layer 7 may contain, e.g., a binder and a conductive agent in addition to a negative electrode active material. For example, the negative electrode 6 is produced in the following manner. The negative electrode active material and the negative electrode mixture containing optional constituents are mixed with a liquid constituent to prepare negative electrode material mixture slurry. The resultant slurry is applied to the negative electrode current collector 8, and then dried.

A known ingredient for positive electrode active material which lithium ions can be inserted into and desorbed from can be used as the positive electrode active material.

A known ingredient for negative electrode active material which lithium ions can be inserted into and desorbed from can be used as the negative electrode active material.

Examples of the binder for use in each of the positive electrode 1 and the negative electrode 6 include polyvinylidene fluoride, polytetrafluoroethylene, styrene-butadiene rubber, polyethylene, polypropylene, and aramid resin.

Examples of the conductive agent for use in each of the positive electrode 1 and the negative electrode 6 include graphites such as natural graphite and artificial graphite, carbon blacks such as acetylene black, ketjen black, channel black, furnace black, lamp black, and thermal black, conductive fibers such as carbon fibers and metal fibers, metal powder such as carbon fluoride powder and aluminum powder, conductive whiskers such as zinc oxide and potassium titanate, conductive metal oxides such as titanium oxide, and organic conductive materials such as a phenylene derivative.

The positive electrode current collector 3 is made of a long conductive substrate having a porous structure, or a long conductive substrate having no pores. The conductive substrate is made of aluminum, for example. The positive electrode current collector 3 preferably has a thickness of 5-20 µm. Designing the positive electrode current collector 3 to have a thickness within this range enables reduction of the weight of the electrode plate with the strength maintained, and reduction of the volume that the electrode plate occupies in the battery.

The negative electrode current collector 8 is also made of a long conductive substrate having a porous structure, or a long conductive substrate having no pores. Examples of materials for the conductive substrate include copper, nickel, and stainless steel. The negative electrode current collector 8 preferably has a thickness of 5-20 µm. Designing the negative electrode current collector 8 to have a thickness within this range enables reduction of the weight of the electrode plate with the strength maintained, and reduction of the volume that the electrode plate occupies in the battery.

In a manner similar to the positive electrode current collector 3, the positive electrode lead 5 is made of aluminum, for example.

In a manner similar to the negative electrode current collector 8, examples of materials for the negative electrode lead 10 include copper and nickel.

Examples of materials for the separator 11 interposed between the positive electrode 1 and the negative electrode 6 include a microporous thin film, a woven fabric, and nonwoven fabric, each of which has high ion permeability, a predetermined mechanical strength, and a predetermined insulation property. Polyolefin such as polypropylene or polyethylene is preferably used as a material for the separator 11. Each of these materials having high durability and a shutdown mechanism is preferably used in view of the safety of the lithium ion battery. Although a separator generally has a thickness of 10-300 µm, the thickness of the separator 11 is preferably 40 µm or less, and more preferably ranges from 15 µm to 30 µm.

Examples of materials for the nonaqueous electrolyte include a liquid material, a gel material, and a solid material (a polymeric solid electrolyte).

The battery case 13 is suitably made of a material which chemically and electrically stable at potentials that the negative electrode 6 can have. Examples of materials for the battery case 13 include iron, nickel, and stainless steel. The battery case 13 may be plated, for example.

Figure 2:
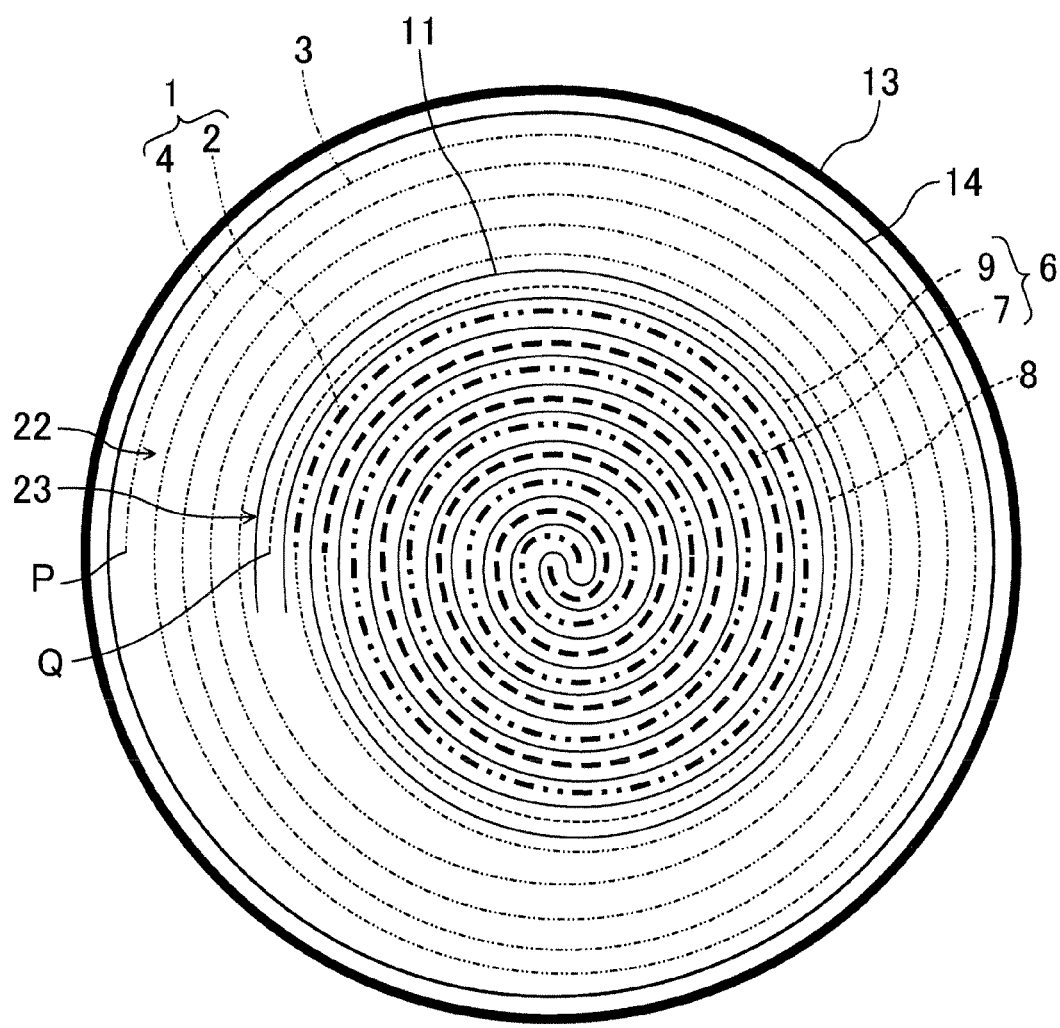
FIG. 2 is a cross-sectional view of the lithium ion secondary battery of the embodiment.

Next, the electrode group of the lithium ion secondary battery according to this embodiment will be described with reference to FIG. 2. FIG. 2 is a traverse cross-sectional view of the lithium ion secondary battery of this embodiment.

As illustrated in FIG. 2, in this embodiment, the positive electrode 1 includes a positive electrode current collector exposing section 4 where both surfaces of the positive electrode current collector are exposed. The positive electrode current collector exposing section 4 extends from an outer circumferential end P of the wound positive electrode 1 in five turns in the electrode group 12. The negative electrode 6 and the separator 11 are not located in the space between adjacent portions of the exposing section 4. Consequently, a positive electrode current collector facing zone (a unipolar electrode current collector facing zone) 22 in which the adjacent portions of the exposing section 4 directly face each other is formed. On the other hand, the negative electrode 6 includes a negative electrode current collector exposing section 9 where a surface of the negative electrode current collector facing the positive electrode current collector exposing section 4 is exposed. The negative electrode current collector exposing section 9 extends from an outer circumferential end Q of the wound negative electrode 6 in one turn in the electrode group 12. The exposing section 9 is located inside the positive electrode current collector facing zone 22, and the separator 11 is interposed between the exposing section 9 and the facing zone 22. Specifically, the exposing sections 4 and 9 face each other with the separator 11 interposed therebetween, thereby forming a heteropolar electrode current collector facing zone 23.

In this embodiment, since the positive electrode current collector facing zone 22 is provided in the outermost portion of the electrode group 12, an insulating layer 14 is disposed between the positive electrode current collector facing zone 22 and the battery case 13 being in electrical connection to the negative electrode 6. The insulating layer 14 can be made of, e.g., a material having ion permeability in a manner similar to the material for the separator 11, or an ion-insulating material such as polyolefin film having no pores.

With this configuration, occurrence of nail penetration or crushing causes an inner short circuit with low short-circuit resistance between the battery case 13 having a negative potential and including no active material and the positive electrode current collector facing zone 22 having a positive potential and including no active material. When the nail penetration or the crushing progresses, a short circuit also occurs between the positive electrode current collector facing zone 22 and the negative electrode current collector exposing section 9, and the short-circuit resistance further decreases. Accordingly, even if further progress of the nail penetration or the crushing causes a short circuit between the active material layers, the current continues flowing to the points in the outer circumferential portion of the battery where the earlier short circuits have occurred. Consequently, almost no current is allowed to pass between the active material layers, and excessive heating is effectively prevented.

In the lithium ion secondary battery of this embodiment, the positive electrode current collector facing zone 22 corresponds to one turn or more in the wound electrode group 12. Thus, the substantial thickness of the positive electrode current collector facing zone 22 is greater than the thickness of a single layer of the positive electrode current collector. It is accordingly possible to further reduce the short-circuit resistance. The thickness of a portion where a short circuit occurs due to occurrence of crushing or nail penetration can be easily increased by forming the positive electrode current collector facing zone 22, without changing the thickness of the positive electrode current collector or the negative electrode current collector. The short-circuit resistance can be thus reduced.

Figure 3:
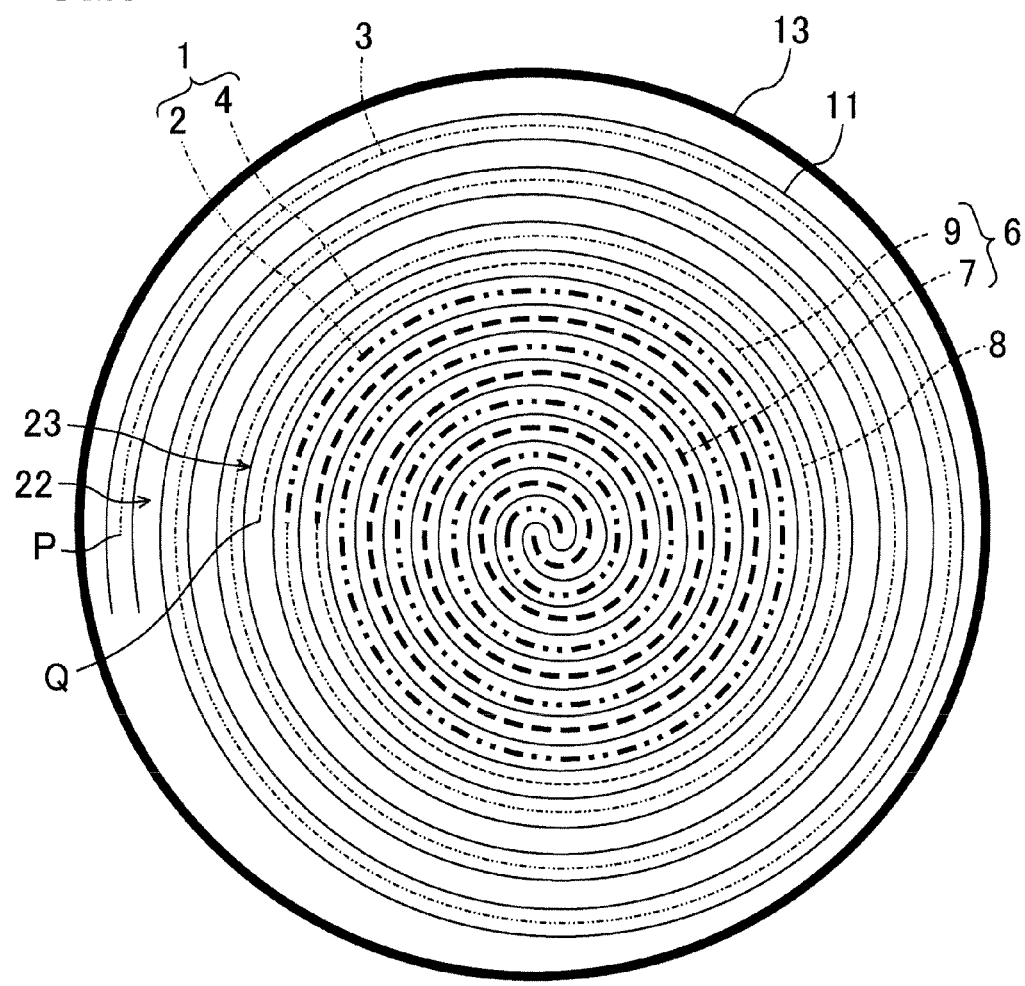
FIG. 3 is a cross-sectional view of a lithium ion secondary battery according to a variation of the embodiment of the present disclosure.

Next, a lithium ion secondary battery according to a variation of the embodiment of the present disclosure will be described with reference to FIG. 3. FIG. 3 is a traverse cross-sectional view of the lithium ion secondary battery of this variation.

This variation differs from the embodiment in the lengths of the positive electrode current collector facing zone 22 and the separator 11. Specifically, as illustrated in FIG. 3, the positive electrode 1 includes the positive electrode current collector exposing section 4, in which both surfaces of the positive electrode current collector are exposed, and which extends from the outer circumferential end P of the positive electrode 1 in three turns. The separator 11 is located in the space between adjacent portions of the exposing section 4. Thus, in the positive electrode current collector facing zone 22 of this variation, the adjacent portions of the positive electrode current collector exposing section 4 face each other with the separator 11 interposed therebetween. The negative electrode 6 includes the negative electrode current collector exposing section 9, in which a surface of the negative electrode current collector facing the positive electrode current collector facing zone 22 is exposed, and which extends from the outer circumferential end Q of the negative electrode 6 in one turn. Consequently, the heteropolar electrode current collector facing zone 23 where the exposing sections 4 and 9 face each other with separator 11 interposed therebetween is formed.

With this configuration, occurrence of nail penetration or crushing first causes a short circuit between the battery case 13 and the positive electrode current collector exposing section 4 located in the outermost turns. Thereafter, progress of the nail penetration or the crushing causes a portion of the separator 11 to rupture in the positive electrode current collector facing zone 22. When the nail penetration and the like further progresses to penetrate an inner portion of the exposing section 4, a short circuit with low short-circuit resistance occurs in a manner similar to the forgoing. Thereafter, when the nail penetration or the crushing progresses more, a short circuit also occurs between the positive electrode current collector facing zone 22 and the negative electrode current collector exposing section 9, and the short-circuit resistance further decreases. Accordingly, even when the nail penetration or the crushing progresses still more to cause a short circuit between the active material layers, the current continues flowing to the points in the outer circumferential portion of the battery where the earlier short circuits have occurred. Consequently, almost no current is allowed to pass between the active material layers, and excessive heating is effectively prevented. In addition, with this configuration, since it is unnecessary to remove a portion of the separator 11 from the positive electrode current collector facing zone 22, the safety of the battery can be improved without making a great change in a fabrication process of the battery. Furthermore, providing the separator 11 increases physical strength, and makes it possible to prevent, e.g. rupture of the positive electrode current collector when winding the positive electrode current collector exposing section 4.

The positive electrode 1 of this embodiment is provided with the positive electrode current collector facing zone 22 corresponding to five turns in the electrode group 12, and the positive electrode 1 of this variation is provided with the facing zone 22 corresponding to three turns in the electrode group 12. The present disclosure, however, is not limited to the embodiment and the variation, and it is suitable that the positive electrode current collector facing zone 22 corresponds to one turn or more. In order to provide the positive electrode current collector facing zone 22 corresponding to one turn or more, it is necessary to determine the length of the positive electrode current collector exposing section 4 such that the exposing section 4 is wound in at least two turns in the electrode group 12. The safety of the battery is improved with increasing length of the exposing section 4 forming the positive electrode current collector facing zone 22. On the other hand, an increase in the length of the exposing section 4 leads to an increase in a rate of volume which the exposing section 4 occupies in the battery, thereby reducing the capacity of the battery. If the battery has a large capacity and the exposing section 4 has a small length, a relatively large current passes between the active material layers, resulting in a risk that the safety of the battery cannot be improved sufficiently. It is therefore preferable to adjust the length of the exposing section 4 according to applications of the battery.

In order to form the positive electrode current collector facing zone 22 easily by winding, the positive electrode current collector facing zone 22 is preferably located in the outermost circumferential portion or the innermost circumferential portion of the electrode group 12. In view of the fact that nail penetration or crushing causes a first short circuit in the outermost circumferential portion of the electrode group 12 and the fact that the safety of the battery is further improved by forming the positive electrode current collector facing zone 22 such that the zone 22 faces the battery case 13 connected to the negative electrode 6, it is more preferable to provide the positive electrode current collector facing zone 22 in the outermost circumferential portion of the electrode group 12.

The positions of the positive electrode and the negative electrode described in this embodiment and this variation may be exchanged. Specifically, the battery case may be in electrical connection to the positive electrode, and a negative electrode current collector facing zone may be formed as the unipolar electrode current collector facing zone. With this configuration, the advantages as described above can also be obtained.

EXAMPLES

The present disclosure will be detailed below with reference to examples and comparative examples.

Example 1

(1) Fabrication of Positive Electrode 1

Figure 4:
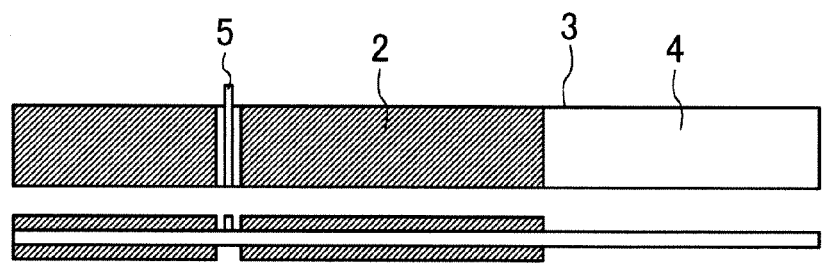
FIG. 4 shows a plan view and a side view of a positive electrode used in examples and comparative examples of the present disclosure.

First, 97 weight percent (wt. %) $LiCoO_2$ which is a positive electrode active material was mixed with 1 wt. % acetylene black serving as a conductive agent and 2 wt. % polyvinylidene fluoride serving as a binder. The resultant mixture was dispersed in an appropriate amount of N-methyl-2-pyrrolidone, and then, kneaded with a dual arm kneader, thereby producing positive electrode material mixture slurry. The positive electrode material mixture slurry was applied to both surfaces of aluminum foil having a thickness of 15 μm and serving as a positive electrode current collector 3, and dried. The foil was then rolled with a roller press. The rolled foil was cut so as to have a width of 57 mm, thereby fabricating a positive electrode 1. As illustrated in FIG. 4, both surfaces of a portion of the positive electrode 1 extending for 107 mm from the outer circumferential end in the longitudinal direction were left free of a positive electrode active material layer 2, thereby forming a positive electrode current collector exposing section 4. A positive electrode lead 5 was joined to a central portion of the positive electrode 1 by ultrasonic welding.

(2) Fabrication of Negative Electrode 6

Figure 5:
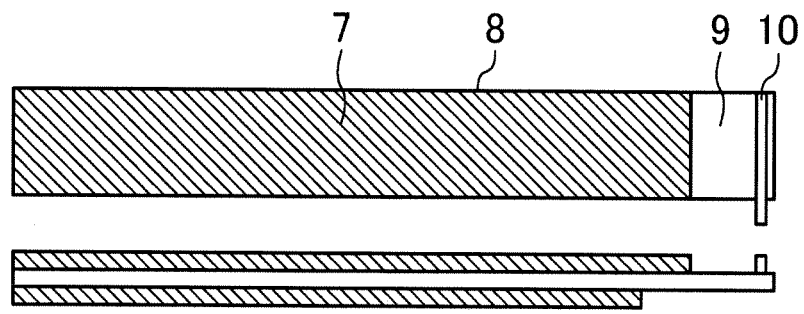
FIG. 5 shows a plan view and a side view of a negative electrode used in the examples and the comparative examples of the present disclosure.

First, 98 wt. % artificial graphite which is a negative electrode active material was mixed with 1 wt. % styrene-butadiene rubber serving as a binder and 1 wt. % carboxymethylcellulose serving as a thickener. The resultant mixture was dispersed in an appropriate amount of water, and then, kneaded with a dual arm kneader, thereby producing negative electrode material mixture slurry. The negative electrode material mixture slurry was applied to both surfaces of copper foil having a thickness of 10 μm and serving as a negative electrode current collector 8, and dried. The foil was then rolled with a roller press. The rolled foil was cut so as to have a width of 58 mm, thereby producing a negative electrode 6. As illustrated in FIG. 5, in a portion of the negative electrode 6 extending from the outer circumferential end and not to face the positive electrode active material layer 2 in a wound state, both surface or one surface were/was left free of a negative electrode active material layer 7, thereby forming a negative electrode current collector exposing section 9. A negative electrode lead 10 was joined to the negative electrode current collector exposing section 9 by ultrasonic welding.

(3) Preparation of Nonaqueous Electrolyte $LiPF_6$ was dissolved, at concentration of 1.2 mol/L, in a mixed solvent containing ethylene carbonate, ethyl methyl carbonate, and dimethyl carbonate at a volume ratio of 25:25:50, thereby preparing a nonaqueous electrolyte.

(4) Assembly of Battery

An electrode group 12 was formed by winding the positive electrode 1 and the negative electrode 6 fabricated in the above manner with a separator 11 interposed therebetween. The separator 11 was made of a single layer of polyethylene resin with a thickness of 16 μm. The positive electrode current collector exposing section 4 was wound so as to extend in outermost two turns in the electrode group 12, thereby forming a positive electrode current collector facing zone 22. A portion of the separator 11 was removed from the positive electrode current collector facing zone 22. Another separator 11 serving as an insulating layer 14 was wound entirely around the outermost circumference of the electrode group 12. After mounting an upper insulating plate 20 and a lower insulating plate 21 on the longitudinal ends of the wound electrode group 12, the electrode group 12 and the insulating plates 20 and 21 were housed in a cylindrical battery case 13 (having an outer diameter of 18 mm, a height of 65 mm, and an inner diameter of 17.85 mm) with a bottom. The positive electrode lead 5 and the negative electrode lead 10 were connected to a lower portion of a filter 17 and the inner surface of the bottom of the battery case 13, respectively. Thereafter, 5.0 g of the foregoing nonaqueous electrolyte was poured into the battery case 13. A terminal plate 15 was mounted on the opening of the battery case 13, and the edge of the opening was crimped toward the terminal plate 15, thereby sealing the battery case 13. In this manner, a cylindrical lithium ion secondary battery whose design capacity is 2750 mAh was fabricated. This battery is a battery of Example 1.

Example 2

In Example 2, a lithium ion secondary battery was fabricated in the same manner as Example 1, except that the positive electrode current collector exposing section 4 had a length of 162 mm and was wound so as to extend in outermost three turns in the electrode group 12. This battery is a battery of Example 2.

Example 3

In Example 3, a lithium ion secondary battery was fabricated in the same manner as Example 1, except that the positive electrode current collector exposing section 4 had a length 218 mm and was wound so as to extend in outermost four turns in the electrode group 12. This battery is a battery of Example 3.

Example 4

In Example 4, a lithium ion secondary battery was fabricated in the same manner as Example 1, except that the positive electrode current collector exposing section 4 had a length of 265 mm and was wound so as to extend in outermost five turns in the electrode group 12. This battery is a battery of Example 4.

Example 5

In Example 5, a lithium ion secondary battery was fabricated in the same manner as Example 1, except that the positive electrode current collector exposing section 4 had a length of 323 mm and was wound so as to extend in outermost six turns in the electrode group 12. This battery is a battery of Example 5.

Example 6

In Example 6, a lithium ion secondary battery was fabricated in the same manner as Example 1, except that the positive electrode current collector exposing section 4 had a length of 382 mm and was wound so as to extend in outermost seven turns in the electrode group 12. This battery is a battery of Example 6.

Example 7

In Example 7, a lithium ion secondary battery was fabricated in the same manner as Example 1, except that, in formation of the electrode group 12, removal of a portion of the separator 11 from the positive electrode current collector facing zone 22 was not carried out. This battery is a battery of Example 7.

Example 8

In Example 8, a lithium ion secondary battery was fabricated in the same manner as Example 3, except that, in formation of the electrode group 12, removal of a portion of the separator 11 from the positive electrode current collector facing zone 22 was not carried out. This battery is a battery of Example 8.

Example 9

In Example 9, a lithium ion secondary battery was fabricated in the same manner as Example 5, except that, in formation of the electrode group 12, removal of a portion of the separator 11 from the positive electrode current collector facing zone 22 was not carried out. This battery is a battery of Example 9.

Example 10

In Example 10, a lithium ion secondary battery was fabricated in the same manner as Example 1, except that the battery was caused to have a design capacity of 3050 mAh by changing the thicknesses of the active material layers of the positive electrode 1 and the negative electrode 6. This battery is a battery of Example 10.

Example 11

In Example 11, a lithium ion secondary battery was fabricated in the same manner as Example 10, except that the battery was caused to have a design capacity of 3000 mAh by changing the lengths in the longitudinal direction of the active material layers of the positive electrode 1 and the negative electrode 6, and that the positive electrode current collector exposing section 4 had a length of 162 mm and was wound so as to extend in outermost three turns in the electrode group 12. This battery is a battery of Example 11.

Example 12

In Example 12, a lithium ion secondary battery was fabricated in the same manner as Example 10, except that the battery was caused to have a design capacity of 2950 mAh by changing the lengths in the longitudinal direction of the active material layers of the positive electrode 1 and the negative electrode 6, and that the positive electrode current collector exposing section 4 had a length of 218 mm and was wound so as to extend in outermost four turns in the electrode group 12. This battery is a battery of Example 12.

Example 13

In Example 13, a lithium ion secondary battery was fabricated in the same manner as Example 10, except that the battery was caused to have a design capacity of 2900 mAh by changing the lengths in the longitudinal direction of the active material layers of the positive electrode 1 and the negative electrode 6, and that the positive electrode current collector exposing section 4 had a length of 265 mm and was wound so as to extend in outermost five turns in the electrode group 12. This battery is a battery of Example 13.

Example 14

In Example 14, a lithium ion secondary battery was fabricated in the same manner as Example 10, except that the battery was caused to have a design capacity of 2850 mAh by changing the lengths in the longitudinal direction of the active material layers of the positive electrode 1 and the negative electrode 6, and that the positive electrode current collector exposing section 4 had a length of 323 mm and was wound so as to extend in outermost six turns in the electrode group 12. This battery is a battery of Example 14.

Example 15

In Example 15, a lithium ion secondary battery was fabricated in the same manner as Example 10, except that the battery was caused to have a design capacity of 2800 mAh by changing the lengths in the longitudinal direction of the active material layers of the positive electrode 1 and the negative electrode 6, and that the positive electrode current collector exposing section 4 had a length of 382 mm and was wound so as to extend in outermost seven turns in the electrode group 12. This battery is a battery of Example 15.

Comparative Example 1

In Comparative Example 1, a lithium ion secondary battery was fabricated in the same manner as Example 1, except that the positive electrode current collector exposing section 4 had a length of 53 mm and was wound so as to extend in outermost one turn in the electrode group 12, and the positive electrode current collector facing zone 22 was not formed. This battery is a battery of Comparative Example 1.

Comparative Example 2

In Comparative Example 2, a lithium ion secondary battery was fabricated in the same manner as Example 10, except that the positive electrode current collector exposing section 4 had a length of 53 mm and was wound so as to extend in outermost one turn in the electrode group 12, and the positive electrode current collector facing zone 22 was not formed. This battery is a battery of Comparative Example 2.

Comparative Example 3

In Comparative Example 3, a lithium ion secondary battery was fabricated in the same manner as Comparative Example 1, except that the battery was caused to have a design capacity of 2300 mAh by changing the thicknesses of the active material layers of the positive electrode 1 and the negative electrode 6. In Comparative Example 3, the positive electrode current collector exposing section 4 was wound so as to extend in outermost one turn in the electrode group 12, and the positive electrode current collector facing zone 22 was not formed. This battery is a battery of Comparative Example 3.

<Nail Penetration Test>

Each of the batteries was charged under the charge conditions as set forth below. Under an environment of 20° C., an iron nail having a diameter of 3 mm was stuck in the side surface of each of the charged batteries at a speed of 10 mm/sec until the nail penetrated each battery, thereby causing an inner short circuit. A temperature which each battery reached after a lapse of 30 seconds was measured with a thermocouple disposed at a point which is on the battery side surface and away from the point at which the nail was stuck. Table 1 shows the results of the measurement.

Charge Conditions:

Constant current charge; a current value of 1000 mA/an end-of-charge voltage of 4.3 V Constant voltage charge; a voltage value of 4.3 V/an end-of-charge current of 100 mA

22. This seems to be because the short-circuit resistance between the positive electrode current collector facing zone 22 and the negative electrode current collector exposing section 9 is lower than short-circuit resistance between a single layer of the positive electrode current collector exposing section 4 and the negative electrode current collector exposing section 9.

No significant temperature differences existed between Examples 7-9 whose positive electrode current collector facing zones 22 included the separator 11 and Examples 1, 3, and 5 whose positive electrode current collector facing zones 22 were free of the separator 11. This seems to be because, in each of Examples 7-9, the separator 11 ruptured in the positive electrode current collector facing zone 22 due to progress of nail penetration, and had no influences on the short-circuit resistance.

The batteries having the positive electrode current collector exposing section 4 wound in two turns had relatively high surface temperatures. The surface temperatures of the batteries decreased with increasing number of turns in which the positive electrode current collector exposing section 4 was wound. No significant temperature differences existed between the batteries having the positive electrode current collector exposing section 4 wound in six turns or more. Accordingly, it is preferable to wind the positive electrode current collector exposing section 4 in three to five turns inclusive, to form the positive electrode current collector facing zone 22.

The batteries of Examples 10-15 having the capacity larger than the batteries of Examples 1-9 had relatively high surface temperatures. A comparison of the examples in respect of the

TABLE 1

| | Number of turns of the positive electrode current collector exposing section | Ratio of the battery capacity to the total thicknss of the positive electrode current collector exposing section in the positive electrode current collector facing zone (mAh/μm) | Presence or absence of the separator in the positive electrode current collector exposing section | Battery surface temperature (° C.) |
|---|---|---|---|---|
| Example 1 | 2 | 92 | Absence | 65 |
| Example 2 | 3 | 61 | | 52 |
| Example 3 | 4 | 46 | | 45 |
| Example 4 | 5 | 37 | | 37 |
| Example 5 | 6 | 31 | | 36 |
| Example 6 | 7 | 26 | | 38 |
| Example 7 | 2 | 92 | Presence | 68 |
| Example 8 | 4 | 46 | | 44 |
| Example 9 | 6 | 31 | | 39 |
| Example 10 | 2 | 102 | Absence | 72 |
| Example 11 | 3 | 67 | | 54 |
| Example 12 | 4 | 49 | | 48 |
| Example 13 | 5 | 38 | | 43 |
| Example 14 | 6 | 32 | | 40 |
| Example 15 | 7 | 27 | | 39 |
| Comparative Example 1 | 1 | 183 | | 134 |
| Comparative Example 2 | 1 | 203 | | 154 |
| Comparative Example 3 | 1 | 147 | | 109 |

As shown in Table 1, after the nail penetration, the surface temperature of each battery of Examples 1-15 that included the positive electrode current collector facing zone 22 facing the negative electrode current collector exposing section 9 was lower by 30° C. or more than the surface temperature of each battery of Comparative Examples 1-3 that did not include the positive electrode current collector facing zone ratio of the battery capacity to the thickness of the positive electrode current collector facing zone 22 showed that the batteries having the ratios which are approximate to each other had the surface temperatures which are approximate to each other.

Figure 6:
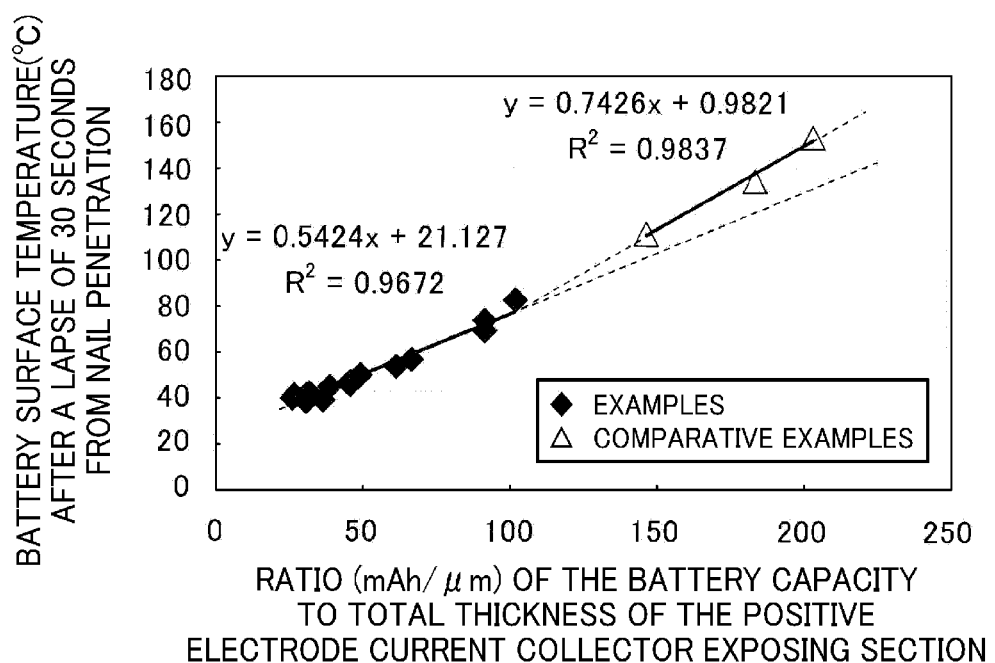
FIG. 6 shows data obtained in the examples and the comparative examples. Specifically.

FIG. 6 is a graph showing the data obtained in the examples and the comparative examples. Specifically, on the graph, plots of the battery surface temperatures after a lapse of 30 seconds from the nail penetration are put, with respect to the ratios of the battery capacity to the total thickness of the positive electrode current collector exposing section in the positive electrode current collector facing zone 22. As shown in FIG. 6, there is a positive correlation between the battery surface temperatures and the ratios. This suggests that, even if the battery capacity changes, the short-circuit resistance can be reduced according to the change in the battery capacity by maintaining constant the ratio of the battery capacity to the total thickness of the positive electrode current collector exposing section in the positive electrode current collector facing zone 22. That is, in order to ensure the safety, the thickness of the positive electrode current collector facing zone 22, i.e., the number of turns in which the positive electrode current collector exposing section 4 is wound can be determined in accordance with the battery capacity.

Linear approximation by the least squares method of the plots corresponding to the examples shown in FIG. 6 gives the following equation, where x represents the ratio (mAh/μ) of the battery capacity to the total thickness of the positive electrode current collector exposing section in the positive electrode current collector facing zone 22, and y represents the battery surface temperature (° C.) after a lapse of 30 seconds from the nail penetration.

$$y=0.5424x+21.127 \quad \text{(Formula 1)}$$

Linear approximation by the least squares method of the plots corresponding to the comparative examples gives the following equation.

$$y=0.7426x+0.9821 \quad \text{(Formula 2)}$$

The gradient of Formula 1 is different from that of Formula 2, which suggests that significant differences existed between the examples and the comparative examples. An intersection point of the two straight lines of Formulas 1 and 2 is written as:

$$x=100.6 \text{ (mAh/μm)}$$

It is presumed that when an x value exceeds this value, the battery surface temperature considerably increases within 30 seconds from the nail penetration. Therefore, the value of x is preferably smaller than or equal to 100 mAh/μm. When the x value was smaller than 40 mAh/μm, the battery surface temperatures after a lapse of 30 seconds from the nail penetration were kept nearly constant at about 40° C. When the x value is excessively small, the rate of volume which the positive electrode current collector exposing section 4 occupies in the battery becomes large and the battery capacity decreases. It is therefore preferable that the x value is larger than or equal to 40 mAh/μm.

INDUSTRIAL APPLICABILITY

The lithium ion secondary battery according to the present disclosure can have improved safety against nail penetration or crushing while having a large capacity. Accordingly, the present disclosure is useful as a technique applicable to not only small power sources for portable electronic devices and the like, but also large power sources for electric vehicles and the like.

DESCRIPTION OF REFERENCE CHARACTERS

1 Positive electrode
2 Positive electrode active material layer
3 Positive electrode current collector
4 Positive electrode current collector exposing section
5 Positive electrode lead
6 Negative electrode
7 Negative electrode active material layer
8 Negative electrode current collector
9 Negative electrode current collector exposing section
10 Negative electrode lead
11 Separator
12 Electrode group
13 Battery case
14 Insulating layer
15 Terminal plate
16 Gasket
17 Filter
18 Inner cap
19 Valve
20 Upper insulating plate
21 Lower insulating plate
22 Positive electrode current collector facing zone (Unipolar electrode current collector facing zone)
23 Heteropolar electrode current collector facing zone

The invention claimed is:
1. A lithium ion secondary battery comprising:
an electrode group formed by winding a positive electrode and a negative electrode with a separator interposed therebetween, the positive electrode including a positive electrode current collector and a positive electrode active material layer formed on a surface of the positive electrode current collector, the negative electrode including a negative electrode current collector and a negative electrode active material layer formed on a surface of the negative electrode current collector;
a nonaqueous electrolyte; and
a battery case housing therein the electrode group and the nonaqueous electrolyte, wherein
the positive electrode has a positive electrode current collector exposing section which is free of the positive electrode active material layer and in which the positive electrode current collector is exposed,
the negative electrode has a negative electrode current collector exposing section which is free of the negative electrode active material layer and in which the negative electrode current collector is exposed,
adjacent portions of the wound positive electrode current collector exposing section or adjacent portions of the wound negative electrode current collector exposing section face each other directly or with the separator interposed therebetween and thereby form a unipolar electrode current collector facing zone,
the unipolar electrode current collector facing zone corresponds to at least one turn in the wound electrode group,
the wound positive electrode current collector exposing section and the wound negative electrode current collector exposing section face each other with the separator interposed therebetween and thereby form a heteropolar electrode current collector facing zone,
the heteropolar electrode current collector facing zone corresponds to at least one turn in the electrode group,
the battery case is in electrical connection to the positive electrode or the negative electrode,
one of the wound positive electrode current collector exposing section or the wound negative electrode current collector exposing section which has a polarity opposite to that of the electrode being in electrical connection to the batter case forms the unipolar electrode current collector facing zone, the unipolar electrode current collector facing zone extends in an outermost circumferential portion of the electrode group, an insulating layer is interposed between the battery case and the unipolar electrode current collector facing zone, and the unipolar electrode current collector facing zone, and one of the positive electrode current collector exposing section or the negative electrode current collector exposing section which has a polarity opposite to that of the unipolar electrode current collector facing zone and which is disposed inside the unipolar electrode current collector facing zone form the heteropolar electrode current collector facing zone.

2. The lithium ion secondary battery of claim 1 wherein the positive electrode current collector exposing section or the negative electrode current collector exposing section forming the unipolar electrode current collector facing zone corresponds to three to five turns inclusive, in the electrode group.

3. The lithium ion secondary battery of claim 1 wherein a ratio of a capacity of the lithium ion secondary battery to a total thickness of the positive electrode current collector exposing section or the negative electrode current collector exposing section which forms the unipolar electrode current collector facing zone is 40-100 mAh/μm inclusive.

* * * * *